US006670069B2

United States Patent
Allen (10) Patent No.: US 6,670,069 B2
(45) Date of Patent: Dec. 30, 2003

(54) FUEL CELL STACK ASSEMBLY

(75) Inventor: Jeffrey P. Allen, Naugatuck, CT (US)

(73) Assignee: GenCell Corporation, Southbury, CT (US)

(*) Notice: Subject to any disclaimer, the term of this patent is extended or adjusted under 35 U.S.C. 154(b) by 267 days.

(21) Appl. No.: 09/808,820

(22) Filed: Mar. 15, 2001

(65) Prior Publication Data

US 2001/0046619 A1 Nov. 29, 2001

Related U.S. Application Data

(60) Provisional application No. 60/190,190, filed on Mar. 17, 2000.

(51) Int. Cl.$^7$ ................................................. H01M 8/02
(52) U.S. Cl. .......................................... 429/37; 429/35
(58) Field of Search ...................................... 429/34–38

(56) References Cited

U.S. PATENT DOCUMENTS

| | | | |
|---|---|---|---|
| 4,169,917 A | 10/1979 | Baker et al. | 429/26 |
| 4,175,165 A | 11/1979 | Adlhart | 429/30 |
| 4,476,197 A | 10/1984 | Herceg | 429/32 |
| 4,510,212 A | 4/1985 | Fraioli | 429/30 |
| 4,548,876 A | 10/1985 | Bregoli | 429/38 |
| 4,604,331 A | 8/1986 | Louis | 429/35 |
| 4,631,239 A | 12/1986 | Spurrier et al. | 429/39 |
| 4,702,973 A | 10/1987 | Marianowski | 429/41 |
| 4,753,857 A | 6/1988 | Hosaka | 429/38 |
| 4,781,996 A | 11/1988 | Toriya et al. | 429/36 |
| 4,853,301 A | 8/1989 | Granata, Jr. et al. | 429/39 |
| 4,857,420 A | 8/1989 | Maricle et al. | 429/30 |
| 4,977,041 A | 12/1990 | Shiozawa et al. | 429/26 |
| 4,978,589 A | 12/1990 | Shiozawa et al. | 429/26 |
| 4,983,472 A | 1/1991 | Katz et al. | 429/38 |
| 5,009,968 A * | 4/1991 | Guthrie et al. | 429/26 |
| 5,084,364 A | 1/1992 | Quaadvliet | 429/34 |
| 5,227,256 A | 7/1993 | Marianowski et al. | 429/16 |

(List continued on next page.)

FOREIGN PATENT DOCUMENTS

| | | |
|---|---|---|
| DE | 196 06 665 | 8/1997 |
| JP | 61024158 | 2/1986 |
| JP | 63 086270 | 4/1988 |
| JP | 02 220359 | 9/1990 |
| JP | 05 299111 | 11/1993 |
| JP | 11 185793 | 7/1999 |
| WO | WO 98/21773 | 5/1998 |

OTHER PUBLICATIONS

EPO English abstract for DE 4206490 (publication date of Sep. 1993).*
English abstract of DE 196 06 665, Aug. 28, 1997.
English abstract of JP 63 086270 (Patent Abstracts of Japan), 4/88.
English abstract of JP 02 220359 (Patent Abstracts of Japan), 9/90.
English abstract of JP 05 299111 (Patent Abstracts of Japan), Nov. 1993.
English abstract of JP 11 185793 (Patent Abstracts of Japan), 7/99.
Toshihiko, "Flat Solid Electrolyte Fuel Cell," abstract of JP Patent No. 07022038, *Patent Abstracts of Japan* (1995), Jan.

Primary Examiner—Susy Tsang-Foster
(74) Attorney, Agent, or Firm—Banner & Witcoff, Ltd.

(57) ABSTRACT

A fuel cell apparatus includes a fuel cell stack positioned within a housing. The housing is contained entirely within a compression assembly. In certain preferred embodiments, the fuel cell stack includes a plurality of bipolar separator plates formed of a plurality of segments, the compression assembly including mating pairs of anode compression bars and cathode compression bars secured to one another and being positioned between a pair of segments.

22 Claims, 11 Drawing Sheets

U.S. PATENT DOCUMENTS

| | | | |
|---|---|---|---|
| 5,298,342 A | 3/1994 | Laurens et al. | 429/35 |
| 5,362,578 A | 11/1994 | Petri et al. | 429/35 |
| 5,424,144 A | 6/1995 | Woods, Jr. | 429/35 |
| 5,460,897 A | 10/1995 | Gibson et al. | 429/39 |
| 5,482,792 A | 1/1996 | Faita et al. | 429/30 |
| 5,503,945 A | 4/1996 | Petri et al. | 429/35 |
| 5,527,363 A | 6/1996 | Wilkinson et al. | 29/623.1 |
| 5,558,955 A | 9/1996 | Breault et al. | 429/38 |
| 5,707,755 A | 1/1998 | Grot | 429/40 |
| 5,726,105 A | 3/1998 | Grasso et al. | 442/326 |
| 5,733,682 A | 3/1998 | Quadakkers et al. | 429/210 |
| 5,770,327 A | 6/1998 | Barnett et al. | 429/32 |
| 5,773,160 A | 6/1998 | Wilkinson et al. | 429/13 |
| 5,773,161 A | 6/1998 | Farooque et al. | 429/34 |
| 5,776,624 A | 7/1998 | Neutzler | 429/26 |
| 5,795,665 A | 8/1998 | Allen | 429/12 |
| 5,798,187 A | 8/1998 | Wilson et al. | 429/26 |
| 5,798,188 A | 8/1998 | Mukohyama et al. | 429/34 |
| 5,811,202 A | 9/1998 | Petraglia | 429/35 |
| 5,833,822 A | 11/1998 | Hsu | 204/270 |
| 5,846,668 A | 12/1998 | Watanabe | 429/32 |
| 5,922,485 A | 7/1999 | Enami | 429/26 |
| 5,942,349 A | 8/1999 | Badwal et al. | 429/34 |
| 6,033,794 A | 3/2000 | George et al. | 429/24 |
| 6,037,073 A | 3/2000 | Besmann et al. | 429/34 |
| 6,040,073 A | 3/2000 | Okamoto | 429/26 |
| 6,040,075 A | 3/2000 | Adcock et al. | 429/32 |
| 6,040,076 A | 3/2000 | Reeder | 429/35 |
| 6,045,934 A | 4/2000 | Enami | 429/30 |
| 6,045,935 A | 4/2000 | Ketcham et al. | 429/30 |
| 6,048,633 A | 4/2000 | Fujii et al. | 429/32 |
| 6,048,634 A | 4/2000 | Kaufman et al. | 429/34 |
| 6,048,636 A | 4/2000 | Naoumidis et al. | 429/44 |
| 6,050,331 A | 4/2000 | Breault et al. | 165/168 |
| 6,051,330 A | 4/2000 | Fasano et al. | 429/30 |
| 6,051,331 A | 4/2000 | Spear, Jr. et al. | 429/34 |
| 6,054,228 A | 4/2000 | Cisar et al. | 429/18 |
| 6,054,231 A | 4/2000 | Virkar et al. | 429/34 |
| 6,071,635 A | 6/2000 | Carlstrom, Jr. | 429/34 |
| 6,071,636 A | 6/2000 | Mosdale | 429/34 |
| 6,074,692 A | 6/2000 | Hulett | 427/115 |
| 6,080,502 A | 6/2000 | Nölscher et al. | 429/34 |
| 6,096,450 A | 8/2000 | Walsh | 429/34 |
| 6,099,984 A | 8/2000 | Rock | 429/39 |
| 6,103,415 A | 8/2000 | Kurita et al. | 429/34 |
| 6,117,580 A | 9/2000 | Nitschké | 429/34 |

\* cited by examiner

FUEL CELL STACK ASSEMBLY

CROSS-REFERENCE TO RELATED APPLICATIONS

This application claims priority to U.S. Provisional Patent Application No. 60/190,190, filed Mar. 17, 2000.

INTRODUCTION

The invention relates to electrochemical fuel cell stacks, and, more particularly to fuel cell stacks having improved assemblies.

BACKGROUND OF THE INVENTION

An electrochemical fuel cell converts the chemical bond energy potential of fuel to electrical energy in the form of direct current (DC) electricity. Fuel cells are presently being considered as replacement for battery storage systems and conventional electric generating equipment.

An electrochemical fuel cell stack is formed of a plurality of individual fuel cells, each possessing a positive (+) and a negative (−) electrical pole, arranged in an electrical series relationship to produce higher useable DC voltage. A DC/AC inverter may be utilized to convert the DC electrical current to AC electrical current for use in common electrical equipment.

A stack of repetitive fuel cells connected in series requires additional non-repetitive hardware in order to operate. For example, manifolds or housings to control and direct reactant gasses, terminals to conduct product electricity, end cells to terminate the repetitive cells of the stack, compression system to apply sealing force, and dielectrics to prevent short circuits may be required.

Commonly, a fuel cell stack is enclosed within a housing for the purpose of controlling the unintended release of reactant and product gasses, and in some instances to provide a portion of a conduit that delivers the reactant gasses from their source to the fuel cell stack and/or product gasses from the fuel cell stack to a point of exhaust or recycle. U.S. Pat. No. 5,688,610 to Spaeh et al. describes a housing that controls the delivery of oxidant to the cathode inlet face of the fuel cell stack. The housing of Spaeh et al. is thermally insulated to control the release of thermal energy to the ambient environment. However, the housing of Spaeh et al. does not completely eliminate the manifolding requirements. Additional manifolds are required to direct the fuel to the stack and the spent fuel exhaust to the point of recycle. An oxidant outlet manifold is required to direct the spent oxidant to the point of exhaust or recycle. These additional manifolds require seals that are subject to leakage and contribute to the migration of electrolyte in liquid electrolyte fuel cell stacks.

U.S. Pat. No. 4,714,661 to Kaun et al. teaches an insulated housing enclosing a fuel cell stack. The housing further provides for the penetration of contact points for the current terminals of the fuel cell stack. A fuel cell stack is equipped with electrical current terminals to withdraw and return the electrical current generated by the electrochemical fuel cell reaction. A first electrical current terminal is typically placed in contact with the positive pole (+) of the first cell. A second electrical current terminal is typically placed in contact with the negative pole (−) of the last cell of the stack. A DC positive and a DC negative current terminal are thereby created.

Typically, a current terminal is comprised of a sheet or plate of electrically conductive material that extends in coplanar fashion with, and across the width and breadth of, the cells comprising the fuel cell stack. The current terminals may be combined with the end plates that are used to provide uniform application of a compressive force applied to the fuel cell stack.

An additional area of the sheet or plate of the current terminal provides a contact point for attachment of an electrical conductor. The contact point may extend beyond the periphery of, or above the plane of, the end cell, and may penetrate through thermal insulation that surrounds the fuel cell stack.

All fuel cells operate at temperatures above ambient room temperature. It is recognized that the maintenance of a uniform operating temperature of the individual cells of fuel cell stacks is critical for optimum performance, and the avoidance of distortions caused by differential thermal expansions. The electrically conductive current terminals create significant sources of heat loss for fuel cells designed to operate at high temperatures. In practical fuel cell stack designs, the current carrying capacities of the current terminals are balanced against the thermal losses created by the current terminals. Excessive heat loss through the terminals results in end cells that operate at less than optimum temperature, or that may have undesirable temperature gradients. The end cells may require additional heat input from electrical end cell heaters to maintain normal operating temperature.

It is desirable that the design and architecture of the end cells of a fuel cell stack be consistent with the design and architecture of central cells of the stack to provide continuity and uniformity of the mechanical stress that accumulates within the stack.

The hardware that comprises the end cells of the fuel cell stack includes the first and last repetitive bipolar separator plates of the stack, and the anode and cathode end plates. The end plates are monopolar plates that house the first anode and the last cathode electrodes, respectively. The first and last electrolyte membranes are installed within the end cells. The monopolar end plates should represent the design and architecture of the central cells because they convey the stack sealing force to the central cells of the stack. Deviation from the design and architecture of central cells results in mechanical discontinuities that contribute to undesirable stress and premature stack failure.

The compression system of the fuel cell stack is intended to uniformly apply the force that seals the individual cells and contributes to low electrical contact resistance at each interface of each component of each cell of the stack. The typical stack comprised of cells manufactured to specific cell area employs various methods of applying the stack compression force. One method, as taught by U.S. Pat. No. 6,057,053 to Gibb, utilizes tie rods that connect compression plates at opposing ends of the fuel cell stack. The rods may penetrate through the stack at apertures provided in the bipolar plates. Tension on the rods is adjustable and springs are provided to compensate for cell compression and thermal expansion. Another method utilizes load beams that traverse the compression plates, and may be cantilevered beyond the periphery of the cells comprising the fuel cell stack. Tie rods are again utilized between the load beams to apply the compressive force.

A dielectric insulator is utilized to electrically isolate one or both end cells from the compression system and/or the stack housing. The dielectric insulator extends to the periphery of the cells comprising the fuel cell stack. The dielectric strength of the insulator must be sufficiently high to prevent excessive short-circuiting of stack current. Low temperature fuel cells may utilize a wide variety of materials for constructing the insulator. The material of construction for the insulator of high temperature fuel cells is highly restricted. Commonly, alumina or mica is utilized as the material of construction for the insulator of high temperature fuel cells. Molten Carbonate Fuel Cell (MCFC) stacks have utilized thick, solid, cast alumina dielectric end plate insulators in conjunction with thick end compression plates. These assemblies are rigid and do not conform well to the changing dimensions of the fuel cell stack. Furthermore, high temperature differentials across the thickness of such end plates results in distortions of the end plates. Often, uniform electrical contact is not maintained at each interface of each cell component of each cell of the fuel cell stack.

U.S. Pat. No. 5,009,968 to Guthrie et al. teaches the use of a thin membrane end plate that will not distort when subjected to thermal differentials across the membrane thickness, since the induced stresses are insufficient to overcome the stack compressive forces. A resilient pressure pad in the form of insulation minimizes the effect of distortion of the thicker pressure plates that are exterior to the thermal insulation and less subjected to thermal distortion.

A phenomenon associated with MCFC stacks is the loss of electrolyte over time. Losses can occur through several mechanisms such as evaporation into the reactant gas streams, voltage driven migration, and simple film creepage. Evaporative losses can be limited by careful control of the reactant flow rate and composition. Voltage driven losses occur primarily through the manifold seals that traverse each cell at the sealing surfaces of each external manifold of externally manifolded fuel cell stacks. U.S. Pat. No. 5,110,692 to Farooque et al. teaches a method of disrupting the flow of voltage driven electrolyte through the manifold gasket. However, the flow of electrolyte is not completely inhibited by the design taught by Farooque et al. Over the practical life of the fuel cell, excessive quantities of electrolyte will migrate through the seals, resulting in an imbalance of electrolyte that impacts stack performance. Loss of electrolyte due to surface creepage can only be addressed by the significant reduction of available surface area.

Fuel cell stacks that utilize a liquid electrolyte may suffer from the undesirable migration of the electrolyte from the electrolyte membrane to other areas of the fuel cell. It is well known in the art that molten carbonate electrolyte employed in molten carbonate fuel cells has several mechanisms of migration. One such mechanism involves migration of the electrolyte via the seal of the external manifold housing. Typically, this seal is comprised of a solid dielectric material, as well as a caulk or paste applied to the irregular face of the stack of bipolar separator plates, and a porous gasket. During operation of the fuel cell stack liquid electrolyte migrates from the electrolyte membrane to the porous gasket and caulk. Voltage present in the fuel cell stack further results in migration of the electrolyte to the anode, or negative pole of the fuel cell stack. Electrolyte migration over time results in the flooding of cells with electrolyte at the anode, or negative pole, of the stack and results in an absence of electrolyte in the cells at the cathode, or positive pole, of the stack. This effect results in premature decay of cells at both poles of the fuel cell stack.

The prior art designs for the housing, end plates, current terminals, compression system, and dielectrics do not adequately address the demands of a stack of fuel cells constructed from such fuel cell sub-assemblies. Therefore, it is desirable to provide an improved fuel cell stack housing, end cell, compression system, dielectric insulator, and current terminals for fuel cell stacks utilizing a bipolar plate that is manufactured in fixed width and variable length. It is also desirable to provide an improved end cell/end plate/dielectric insulator/compression system assembly that offers high compliance to the dimensional changes that occur within the fuel cell stack. It is further desirable to provide a reduced quantity of external manifold seals and to reduce the surface area of the end cell hardware to reduce the losses of electrolyte that occur as a result of voltage driven migration and surface film creepage.

It is an object of the present invention to provide a fuel cell stack assembly that reduces or wholly overcomes some or all of the difficulties inherent in prior known devices. Particular objects and advantages of the invention will be apparent to those skilled in the art, that is, those who are knowledgeable or experienced in this field of technology, in view of the following disclosure of the invention and detailed description of preferred embodiments.

SUMMARY

The present invention provides an improved assembly for a fuel cell stack. Preferred embodiments of the present invention minimize the loss of electrolyte and reduce the materials required to form a fuel cell stack assembly.

In accordance with one aspect, a fuel cell apparatus includes a compression assembly, a housing contained entirely within the compression assembly, and a fuel cell stack positioned within the housing.

In accordance with another aspect, a fuel cell apparatus includes a housing comprised of a first half-shell and a second half-shell. A fuel cell stack is positioned within the housing. The fuel cell stack includes a plurality of bipolar separator plates positioned between a cathode end plate and an anode end plate. Each bipolar separator plate includes a plurality of segments, and each segment includes a fuel flow path and an oxidant flow path. Each of a plurality of anode compression bars is secured to a mating cathode compression bar. Each mating pair of compression bars is positioned between a pair of segments. The housing is positioned between the anode compression bars and the cathode compression bars. A cathode compression plate is positioned between each cathode compression bar and one of the half-shells. An anode compression plate is positioned between each anode compression bar and the other of the half-shells.

BRIEF DESCRIPTION OF THE SEVERAL VIEWS OF THE DRAWING

The aspects of the invention will become apparent upon reading the following detailed description in conjunction with the accompanying drawings, in which.

DETAILED DESCRIPTION OF THE INVENTION

In the prior art, the cells comprising a fuel cell stack are manufactured to a specific length and width to define a cell area. Economies of scale can be more rapidly achieved when utilizing the manufacturing techniques associated with a variable length bipolar plate. A repetitive section of the bipolar plate is continuously reproduced in one axis of the bipolar plate. The production methods of the remaining cell components (i.e. anode, cathode, and electrolyte matrix/membrane) are consistent with the production methods of the variable length bipolar plate. As a result, a cost effective fuel cell sub-assembly becomes one with a relatively short fixed width and a relatively long and variable length. Such a variable length bipolar separator plate is described in commonly owned U.S. patent application Ser. No. 09/714,526, filed on Nov. 16, 2000, and entitled "Fuel Cell Bipolar Separator Plate and Current Collector Assembly and Method of Manufacture," the entire disclosure of which is incorporated herein by reference for all purposes.

Figure 1:
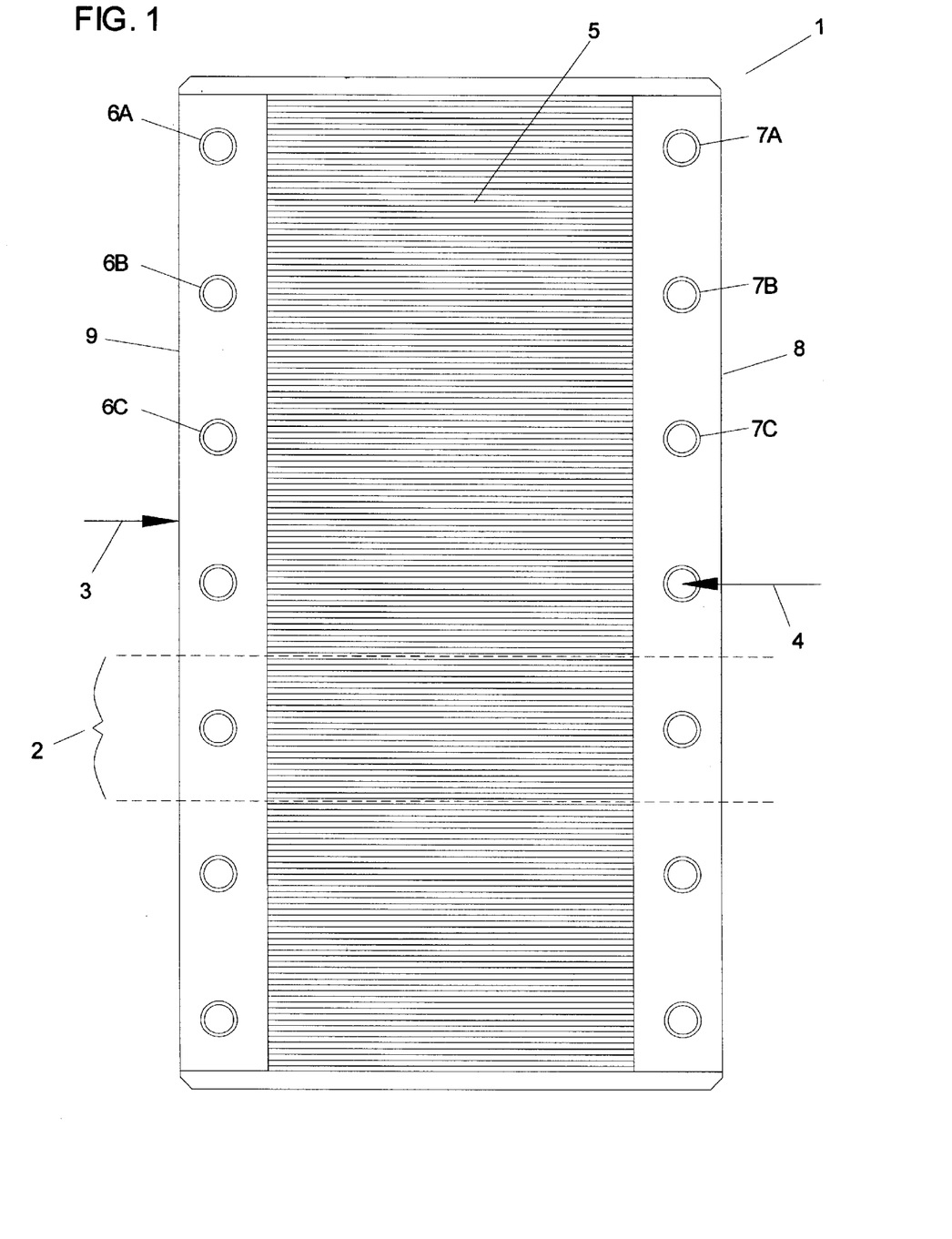
FIG. 1 illustrates a plan view of a bipolar separator plate for a fuel cell stack in accordance with the present invention.

FIG. 1 shows the anode side of a bipolar separator plate 1 in accordance with a preferred embodiment of the present invention. The tooling that produces bipolar separator plate 1 creates a series of defined segments 2 with each strike of the tooling on the material used to form bipolar separator plate 1. Each segment 2 includes means to fluidly couple the oxidant flow stream 3 and fuel flow stream 4 to the active area 5 of the bipolar separator plate 1. The progressive tooling advances the material comprising the bipolar separator plate at each open and shut cycle of the tooling. As such, a continuous flow of die-stamped material suitable for further processing to produce bipolar separator plate 1 is created.

Each segment 2 contains an oxidant fluid flow path and a fuel flow path into and from which oxidant and fuel flow through internal or external manifolds positioned at opposing edges of the bipolar separator plate. The flow streams traverse the bipolar separator plate in a co-current or counter-current flow with respect to one another.

In a preferred embodiment, a plurality of outlet manifold openings 6A, 6B, 6C, and a plurality of inlet manifold openings 7A, 7B, 7C are provided at the edge areas of the bipolar separator plate 1, and act in unison to provide uniform flow across either the anode or the cathode surface of the bipolar separator plate 1 for fuel or oxidant. Manifolds created through the plane of bipolar separator plate 1 and in fluid communication with one surface of the bipolar separator plate are referred to in the art as internal manifolds.

Outer edge 8 and opposing outer edge 9 may be fluidly coupled to either the anode surface or the cathode surface of bipolar separator plate 1 to provide a flow path for the other of the fuel or oxidant. The outer edges 8, 9 may be open along the entire length of bipolar separator plate 1. Open edge manifolds are referred to in the art as external manifolds.

Paired internal and/or external manifold openings within each segment 2 provide uniform flow across either the anode or cathode surface of each respective segment 2 for fuel or oxidant. Therefore, a bipolar separator plate 1 may be progressively produced from the tooling with any practical length and, therefore, any practical quantity of segments 2. Furthermore, a stack of fuel cells assembled from bipolar separator plates 1 may be produced with any practical length and, therefore, any practical quantity of segments 2.

Figure 2:
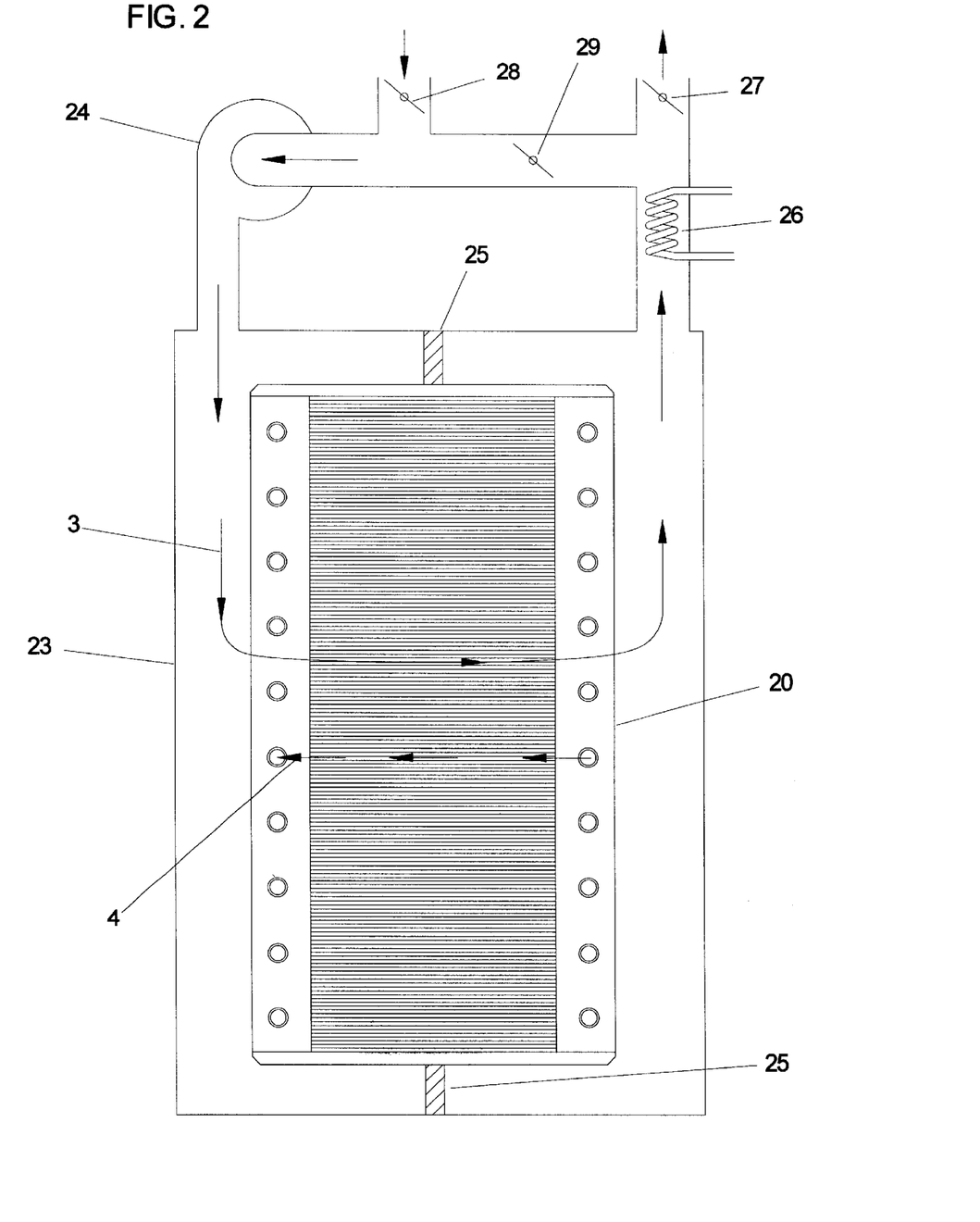
FIG. 2 illustrates a schematic flow diagram of flow streams of a fuel cell stack in accordance with the present invention.

FIG. 2 provides a schematic flow diagram of an externally manifolded oxidant flow stream 3 and a counter-currently flowing internally manifolded fuel flow stream 4 in use in a fuel cell stack 20. Each segment 2 has a corresponding oxidant flow stream 3 and fuel flow stream 4. Housing 23 encloses and directs the externally manifolded oxidant flow stream 3.

A pump or blower 24 provides a motive force to the externally manifolded oxidant flow stream 3 through the fuel cell stack 20. Seals 25 are provided externally at the ends of the stack to isolate the input side of fuel cell stack 20 from the output side of fuel cell stack 20. Oxidant flow stream 3 may interact with a heat exchanger 26 to extract heat from the flow stream 3 in a closed loop. Alternatively, a portion of the flow stream 3 may be rejected via valve 27. Make-up flow may be added to the input side of the flow stream 3 via valve 28. System pressure and recirculation may be controlled via valve 29.

In this manner the housing, valve, and blower arrangement may be utilized to control the composition and/or the temperature of the externally manifolded flow stream 3. Thus, the externally manifolded flow stream 3 may be advantageously utilized to control the temperature and/or performance of fuel cell stack 20. Fuel cell stack 20 generates heat during the exothermic fuel cell reaction and consumes oxygen and fuel in the process.

Housing 23 and the counter-flow manifold arrangement for the reactants advantageously minimizes the quantity of seals required to effect the sealing of the reactant gas applied to the external manifolds. The arrangement of manifolds advantageously minimizes the quantity of external manifold seals to two and, consequently, significantly reduces the volume and flow rate of migratory electrolyte for externally manifolded liquid electrolyte fuel cells.

It further may be appreciated that the manifold and housing arrangement illustrated in FIG. 2 results in the complete enclosure and encapsulation of the four lateral faces of fuel cell stack 20. As such, the four lateral faces of fuel cell stack 20 are maintained in an atmosphere where the composition of said atmosphere is determined by the flow stream assigned to the external manifold. This effect may advantageously be utilized for a variety of beneficial effects. For example, it is well established in the art that molten carbonate electrolyte employed in molten carbonate fuel cells will decompose if exposed to atmospheres with low carbon dioxide partial pressure. Observation has revealed that decomposed carbonate electrolyte possesses a higher degree of corrosive properties to the material comprising the bipolar separator plates as well as a higher degree of mobility. The complete encapsulation of the fuel cell stack by the manifold and housing arrangement eliminates the potential for electrolyte decomposition if the reactant assigned to the external manifold of an MCFC stack is the carbon dioxide laden oxidant reactant. If the reactant assigned to the external manifold of an MCFC stack is the fuel, the composition of the fuel should include carbon dioxide.

Figure 3:
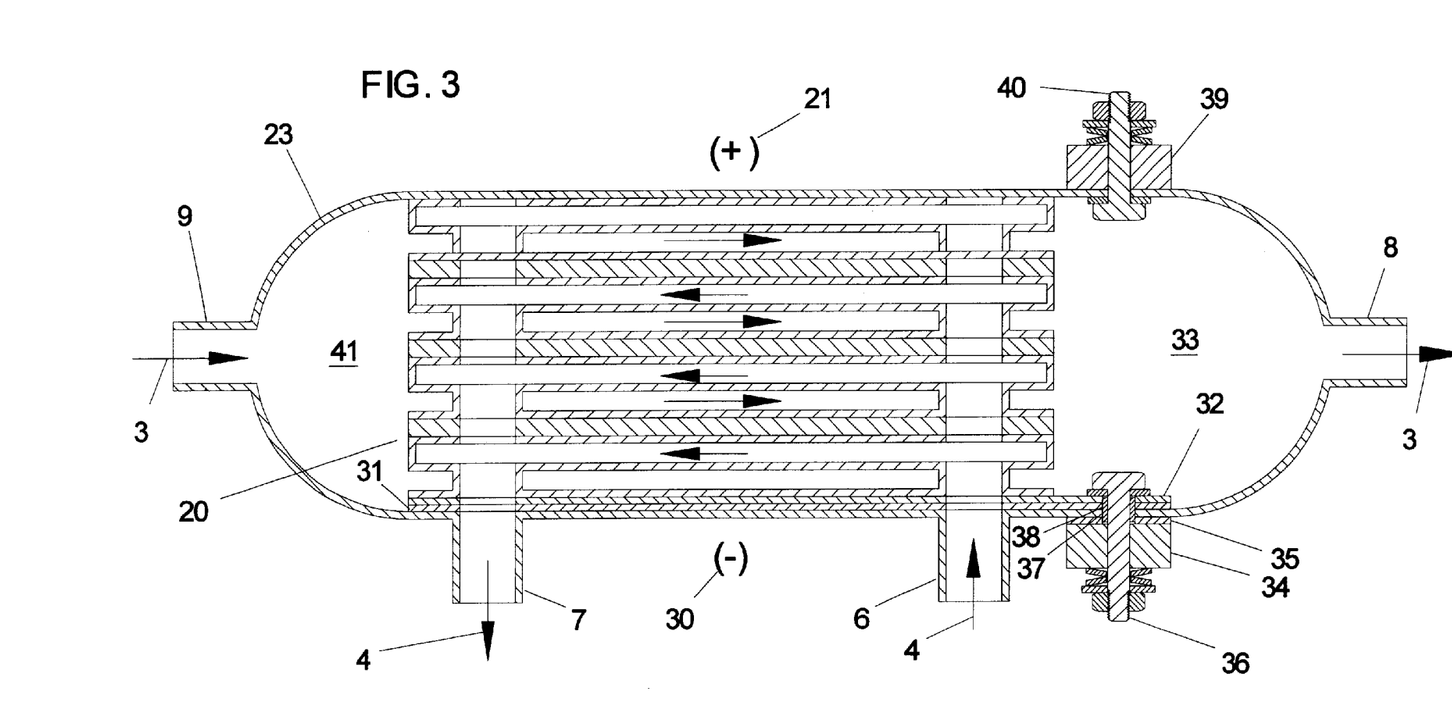
FIG. 3 illustrates in cross-section a multiple-cell fuel cell stack utilizing internal manifolds for delivery and removal of the fuel stream and utilizing external manifolds for delivery and removal of the oxidant stream and enclosed within a housing, in accordance with the present invention.

A multiple-cell fuel cell stack 20 enclosed within a housing 23 is seen in FIG. 3. An internal inlet manifold 6 provides for the delivery of the fuel stream 4, and an internal outlet manifold 7 provides for the removal of fuel stream 4. An external manifold 9 provides for delivery of the oxidant stream 3 into an inlet chamber 41, and an external manifold 8 provides for removal of the oxidant stream 3 from an outlet chamber 33. A negative pole 30, or anode end, of fuel cell stack 20 is separated from housing 23 by a dielectric spacer 31. A power take-off terminal 32 extends from beneath fuel cell stack 20 and extends into outlet chamber 33 of housing 23.

An electrically conductive bus bar 34 is positioned adjacent the power take-off terminal 32 exterior to housing 23. A dielectric spacer 35 is disposed between the bus bar 34 and housing 23. An electrically conductive fastener 36 connects power take-off terminal 32 to bus bar 34 via an aperture 37 formed in housing 23. A dielectric spacer 38 isolates fastener 36 from the surface of aperture 37 extending through housing 23. A positive pole 21, or cathode end, of fuel cell stack 20 is in intimate electrical contact with housing 23. An electrically conductive bus bar 39 is positioned exterior to housing 23, and is attached to housing 23 via an electrically conductive fastener 40.

Electricity generated within fuel cell stack 20 may flow from negative pole 30 of fuel cell stack 20 through power take-off terminal 32 and bus bar 34 to an external electrical circuit to power an electrical appliance or machine. Electric current may return to the positive pole 21 of fuel cell stack 20 through bus bar 39 and housing 23.

Dielectric spacer 31 may consist of a non-conductive ceramic for high temperature fuel cells, or non-conductive plastic for low temperature fuel cells, and may be substantially dense and non-porous. In certain preferred embodiments, dielectric spacer 31 may consist of a single pre-fired cast ceramic plate. In other preferred embodiments, dielectric spacer 31 may consist of a single non-fired, or green, ceramic plate. Alternatively, dielectric spacer 31 may consist of a single or multiple non-fired, or green, ceramic sheets produced with conventional tape casting equipment. The thickness of dielectric spacer 31 is determined by the dielectric strength required to withstand the voltage produced by the plurality of fuel cells comprising fuel cell stack 20. If dielectric spacer 31 is porous, a substantially non-porous dielectric spacer may be utilized in the form of a strip at the perimeter of the dielectric spacer 31 to affect a more positive seal between outlet chamber 33 and inlet chamber 41 and to minimize the absorption of liquid electrolyte.

Figure 4:
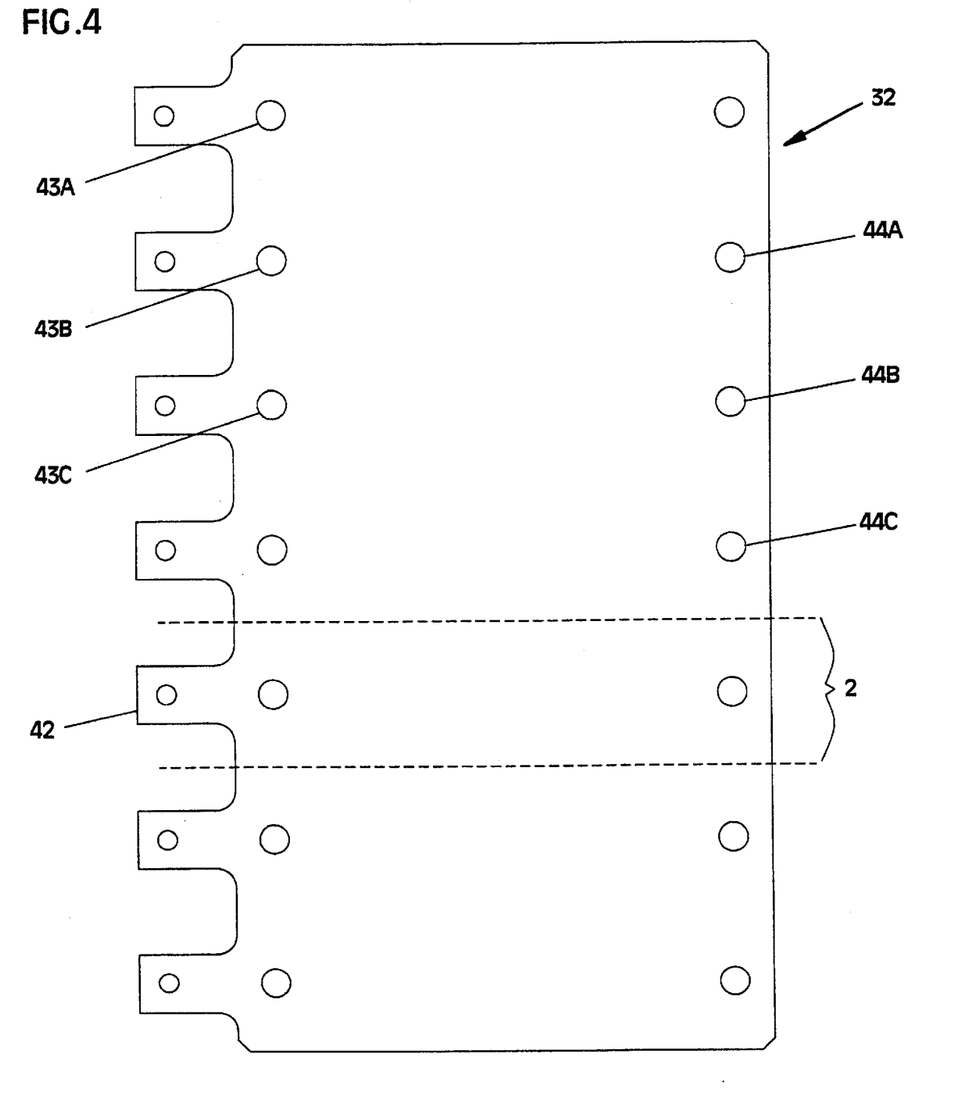
FIG. 4 illustrates a plan view of the anode power take-off terminal of FIG. 3.

An anode power take-off terminal 32 for use with fuel cell stack 20 is seen in FIG. 4, and is formed of a bipolar separator plate 1 including multiple segments 2. Each segment 2 is provided with an extension 42. The cross-sectional area of each extension 42 is selected based upon the maximum anticipated electrical current produced from each segment 2 of fuel cell stack 20. As is well established in the art, the output electrical voltage of a fuel cell stack is determined by the quantity of the cells comprising the fuel cell stack to the extent supported by the electrochemical reaction. As is further well established in the art, the output electrical current of a fuel cell stack is determined by the area of the cells comprising the fuel cell stack to the extent supported by the electrochemical reaction. Also, the current carrying capacity of an electrical conductor is determined by its cross-sectional area and the coefficient of electrical conductivity of the material of construction of the electrical conductor. As such, a known maximum electrical current can be anticipated to be generated from each of segment 2 of fuel cell stack 20, and the cross-sectional area of each extension 42 of power take-off terminal 32 and housing 23 may be determined. Furthermore, a known maximum electrical current can be anticipated to be generated from the sum of the defined sections 2 of fuel cell stack 20, and the cross-sectional area of the bus bars 34 and 39 may be determined.

The effect of temperature on the conductivity properties of the materials forming power take-off terminal 32, housing 23, and bus bars 34 and 39 is well established in the art and may be utilized to further determine the appropriate cross-sectional area of these components for optimum current carrying capability with respect to the various operating temperatures of the various fuel cell types. Furthermore, if desired, a similar power takeoff terminal 32 may be applied to the cathode pole of fuel cell stack 20. A power take-off terminal applied to the cathode pole may be applied to the exterior of the housing. In such an embodiment, the cathode pole is grounded to the housing.

By applying the cathode power take-off terminal and anode and cathode end heaters to the exterior of the housing, the surface area of the end cells is reduced, and the loss of electrolyte due to surface film creepage is limited. Surface area may be further reduced if the interior of the housing not acting as an electrical conductor receives an anti-corrosion coating such as diffused aluminum. In this manner, the growth of corrosion scale and, hence, surface area is limited. The anti-corrosion coating of the housing may extend into the peripheral area of the stack occupied by the seal and manifold areas of the bipolar separator plates, but not into the current producing active area of the bipolar separator plates. Likewise, the anode power take-off terminal may receive an anti-corrosion coating on non-conducting areas to include the full area of the side adjacent the dielectric spacer.

The plurality of through holes 43A, 43B, 43C and 44A, 44B, 44C seen in FIG. 4, correspond to the plurality of internal manifolds of the bipolar separator plates 1 comprising fuel cell stack 20. The through holes may be fitted with feed tubes welded to the anode power take-off terminal 32 for the purpose of directing the fuel stream to or from the internal fuel manifolds of the fuel cell stack.

Figure 5:
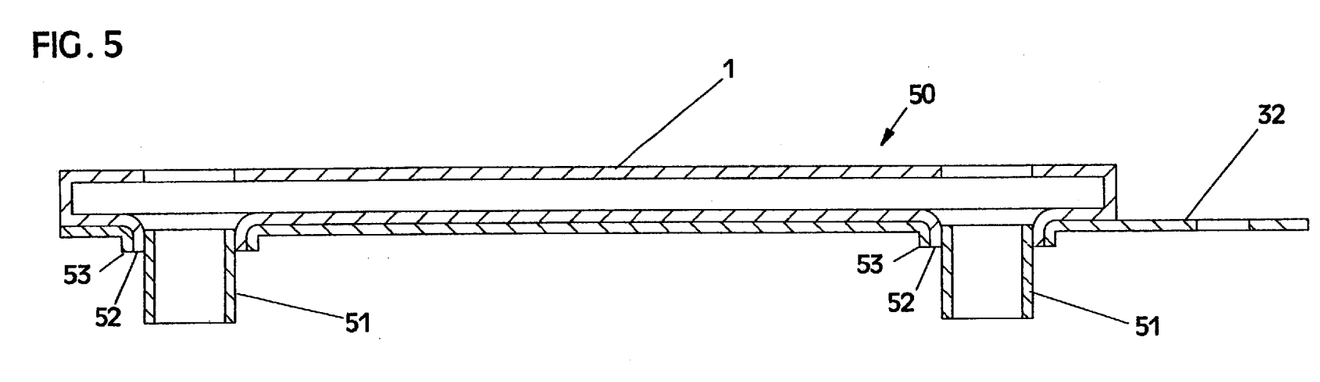
FIG. 5 illustrates a cross-section view of an internal manifold of an anode end plate showing a power take-off terminal, feed tubes, and a monopolar separator in accordance with the present invention.

The anode end cell 50, or bottom cell, of fuel cell stack 20, as seen in FIG. 5, may consist of a bipolar separator plate 1 modified for adaptation to the end cell by removal or blockage of the cathode chamber of the bipolar separator plate 1. The modification may further consist of inclusion of a portion of the material comprising the bipolar separator plate 1 into the weld joining feed tubes 51 to the power take-off terminal. The material forming the opening of the internal fuel manifold of bipolar separator plate 1 has been drawn into a raised shoulder 52. The material forming the opening through power take-off terminal 32 has also been drawn into a raised shoulder 53. The inside surface of the openings created by raised shoulders 52 and 53 shaped and sized to receive a feed tube 51. A weld may be applied to the perimeter of shoulders 52 and 53 and the base of feed tube 51. Preferably the weld is a fusion weld that does not require filler material. Experience has shown that Tungsten Inert Gas type welding applied by a skilled operator with proper heat sinks and fixtures provides a superior welded joint at low cost. Thermal distortion of the thin metallic power take-off terminal 32 resulting from heat applied during application of weld may be controlled with the application of a shallow secondary step pressed into the power take-off terminal 32, concentric with first shoulder 53. This shallow secondary step adds significant structural strength to the area of the power take-off terminal 32 immediately adjacent the site of the weld, and prevents propagation of thermal distortion.

Figure 6:
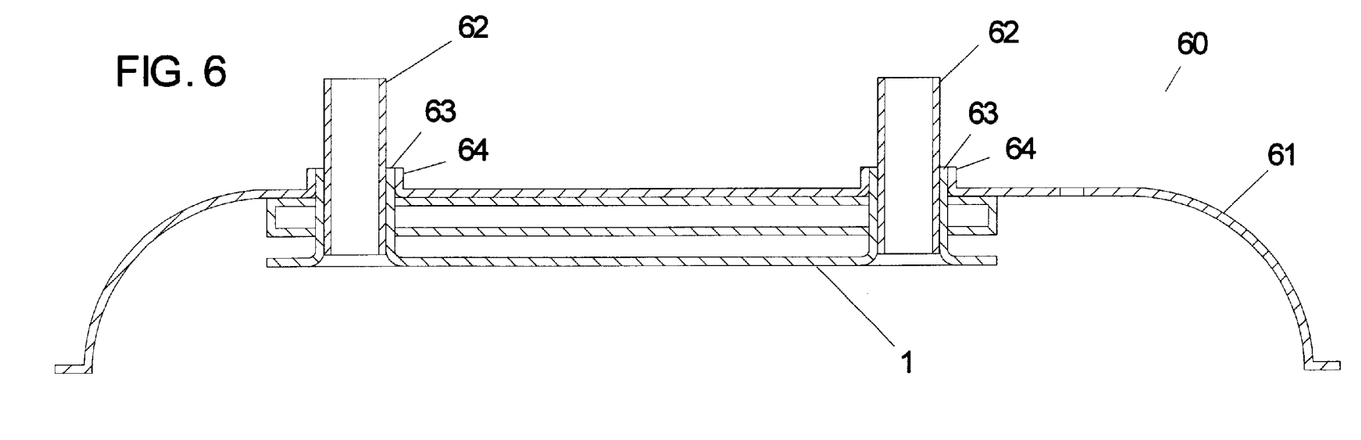
FIG. 6 illustrates a cross-section view of an internal manifold of a cathode end plate comprised of cathode housing half-shell, feed tubes, and a monopolar separator in accordance with the present invention.

An internal manifold of a cathode end plate 60 formed of a cathode housing half-shell 61, feed tubes 62, and a modified bipolar separator plate 1 is seen in FIG. 6. As described above in connection with FIG. 5, raised shoulders 63 and 64 are drawn into the material forming cathode housing half-shell 61 and bipolar separator plate 1. As noted above in connection with FIG. 5, a fusion weld may be applied to combine the raised shoulders 63 and 64 with feed tubes 62.

Figure 7:
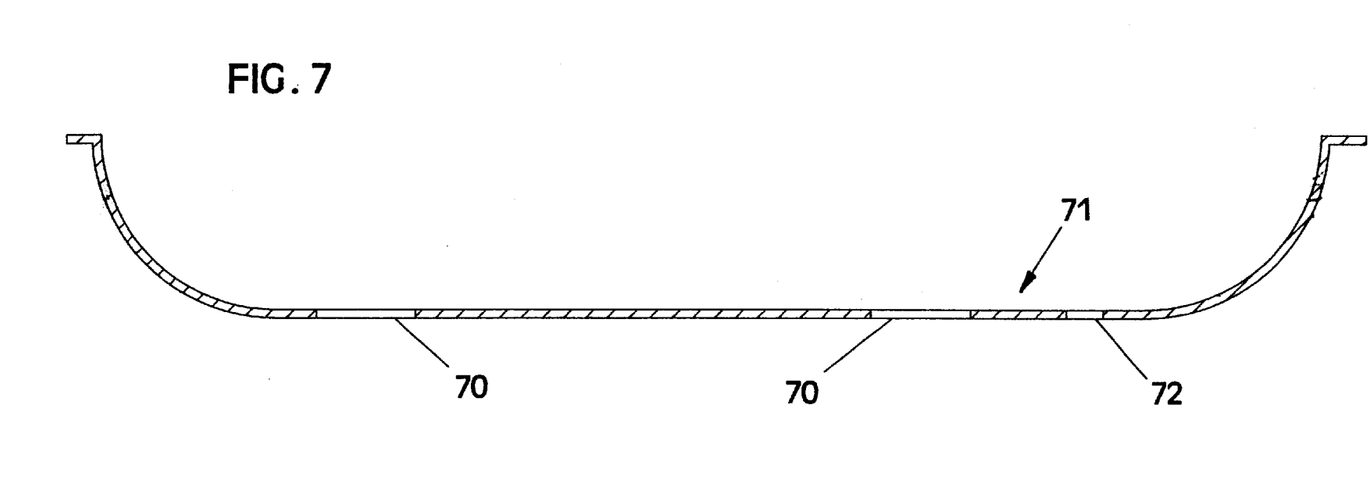
FIG. 7 illustrates a cross-section view of an internal manifold penetration of an anode housing half-shell in accordance with the present invention.

In certain preferred embodiments, an internal manifold aperture 70 is formed in anode housing half-shell 71, as seen in FIG. 7. A bus bar fastener aperture 72 is also formed in half-shell 71.

Figure 8:
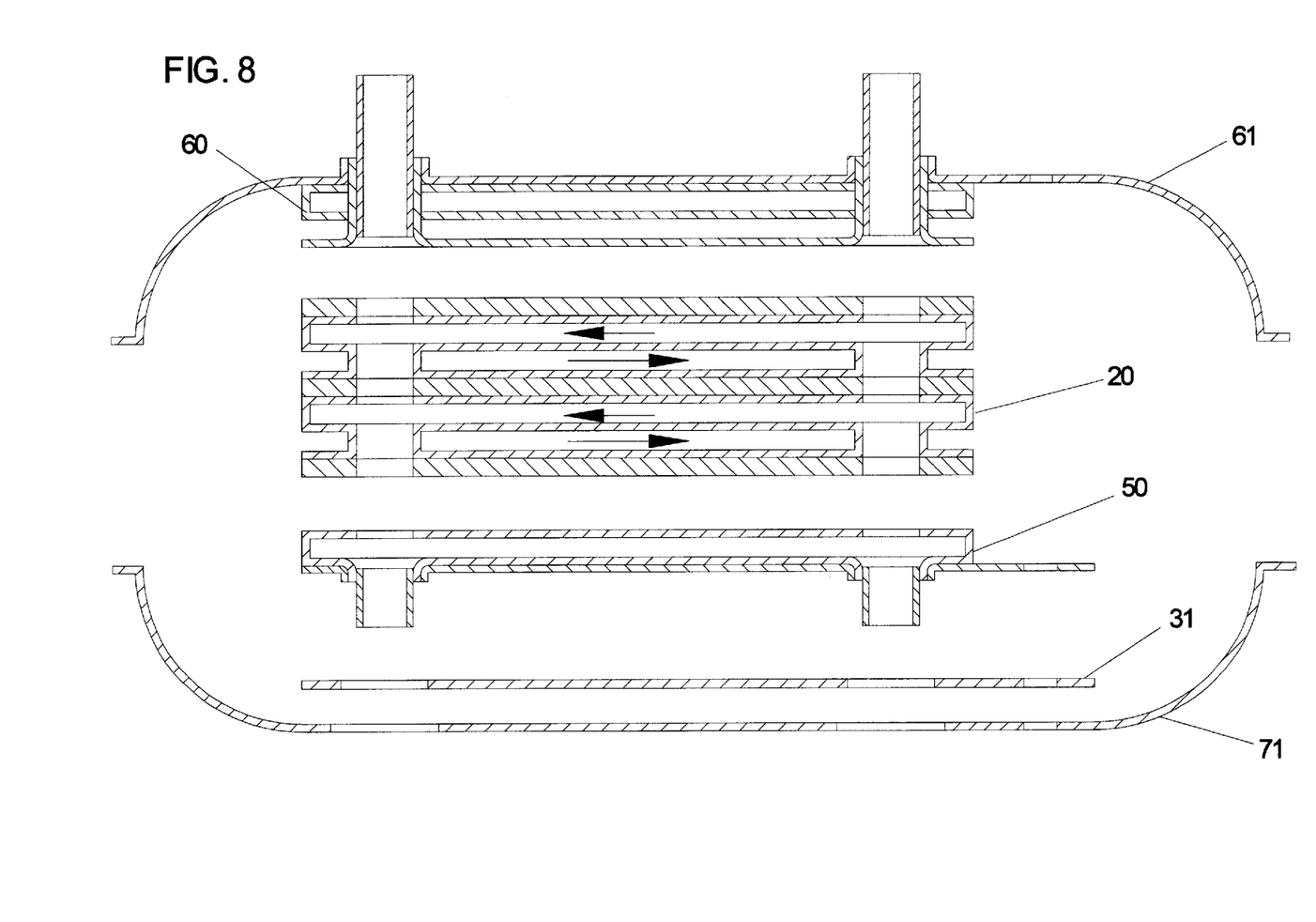
FIG. 8 illustrates a cross-section view of an internal manifold of an exploded assembly of an anode housing half-shell, dielectric spacer, anode end plate, fuel cell stack, and cathode end plate in accordance with the present invention.

In accordance with other preferred embodiments, an internal manifold of an exploded fuel cell stack assembly 20 is seen in FIG. 8, and includes an anode housing half-shell 71, a dielectric spacer 31, an anode end plate 50, a fuel cell stack 20, and a cathode end plate 60.

Figure 9:
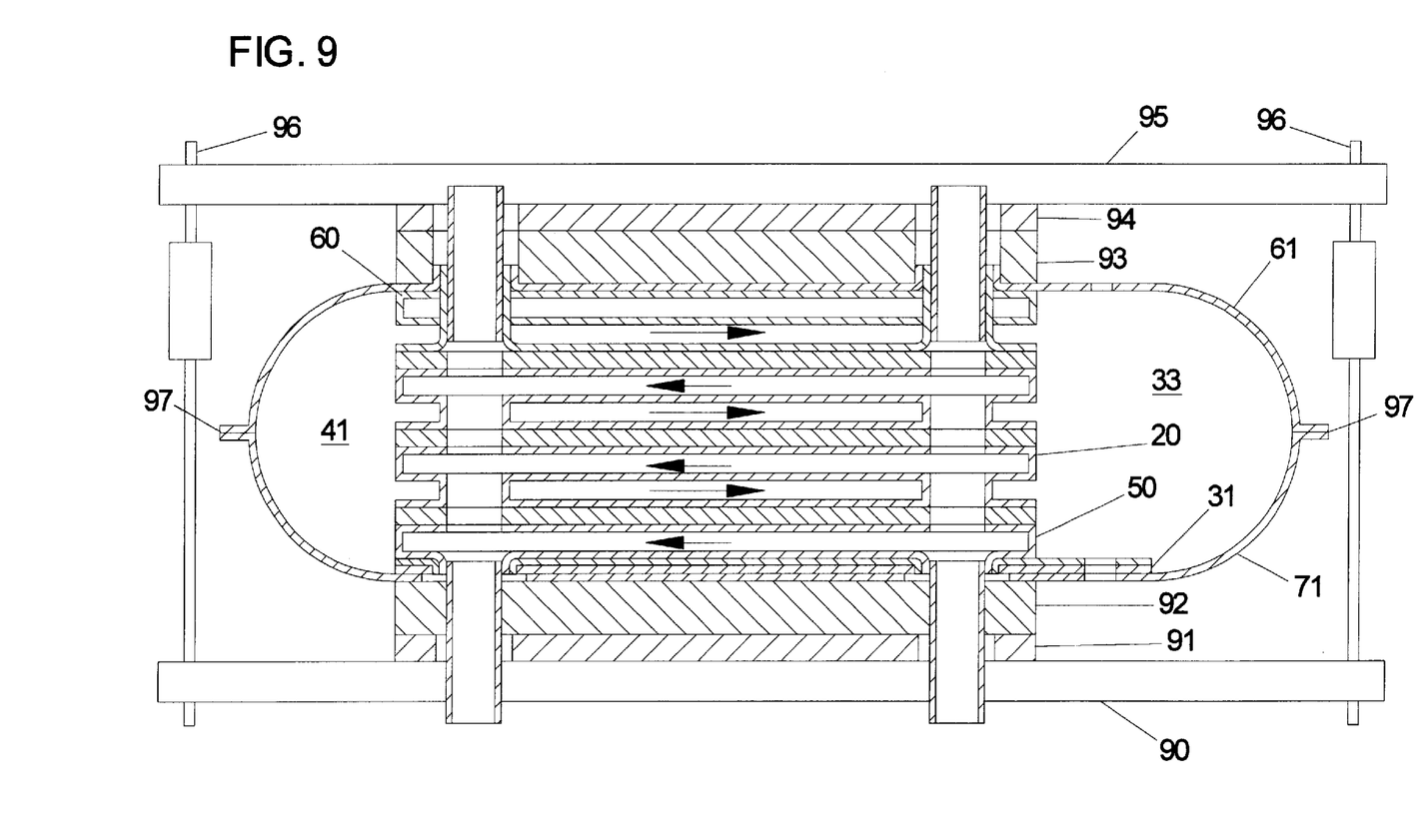
FIG. 9 illustrates a cross-section view of an internal manifold of a partially assembled fuel cell stack in accordance with the present invention.

In accordance with certain other preferred embodiments, an internal manifold of a fuel cell stack assembly 20 suitable for high temperature fuel cells is seen in FIG. 9. An anode housing half-shell 71 and a cathode housing half-shell 61 housing fuel cell stack 20 are mated together and positioned between a plurality of first compression bars 90, referred to herein as anode compression bars 90 since they are positioned on the anode side of the fuel cell stack assembly 20, and a plurality of second compression bars 95, referred to herein as cathode compression bars 95 since they are positioned on the cathode side of the fuel cell stack assembly 20, although only a single pair of mating anode compression bars 90 and cathode compression bars 95 is seen here. There is a mating pair of anode compression bars 90 and cathode compression bars 95 positioned between each pair of adjacent segments 2 of each bipolar separator plate 1. Dielectric spacer 31 is positioned between anode end plate 50 and anode housing half-shell 71. An anode cold compression plate 91 and anode insulation 92 are positioned between anode compression bar 90 and anode housing half-shell 71. A cathode cold compression plate 94 and cathode insulation 93 are positioned between cathode compression bar 95 and cathode housing half-shell 61. Compression tie rods 96 extend between anode compression bar 90 and a cathode compression bar 95. The seam 97 that occurs at the mating surfaces of the housing half-shells may be fusion welded by a tungsten inert gas method. Compressive sealing loads may be maintained within a pre-determined range via spring loaded compression tie rods 96 to accommodate thermal expansions and component mechanical creep.

The system utilized to provide the compressive force that holds the components of the fuel cell stack in compression is commonly referred to in the art as a compression system. The mass and complexity of compression systems of high temperature fuel cells generally can be reduced, provided that the system is situated exterior to the high temperature zones that occur within the thermally insulated fuel cell.

Another preferred embodiment of the invention relating to low temperature fuel cell stack applications and to the compression system involves placement of the tie rods 96 within and through internal manifolds of the fuel cell stack. Tie rod 96 placements may also occur within and through internal penetrations fluidly isolated from the flow streams. In this manner, the anode and cathode compression bars 90, 95 may substantially be eliminated, and the compression force reaction may be taken directly at the cold compression plates 91, 94 via spring-loaded tie rods.

Figure 10:
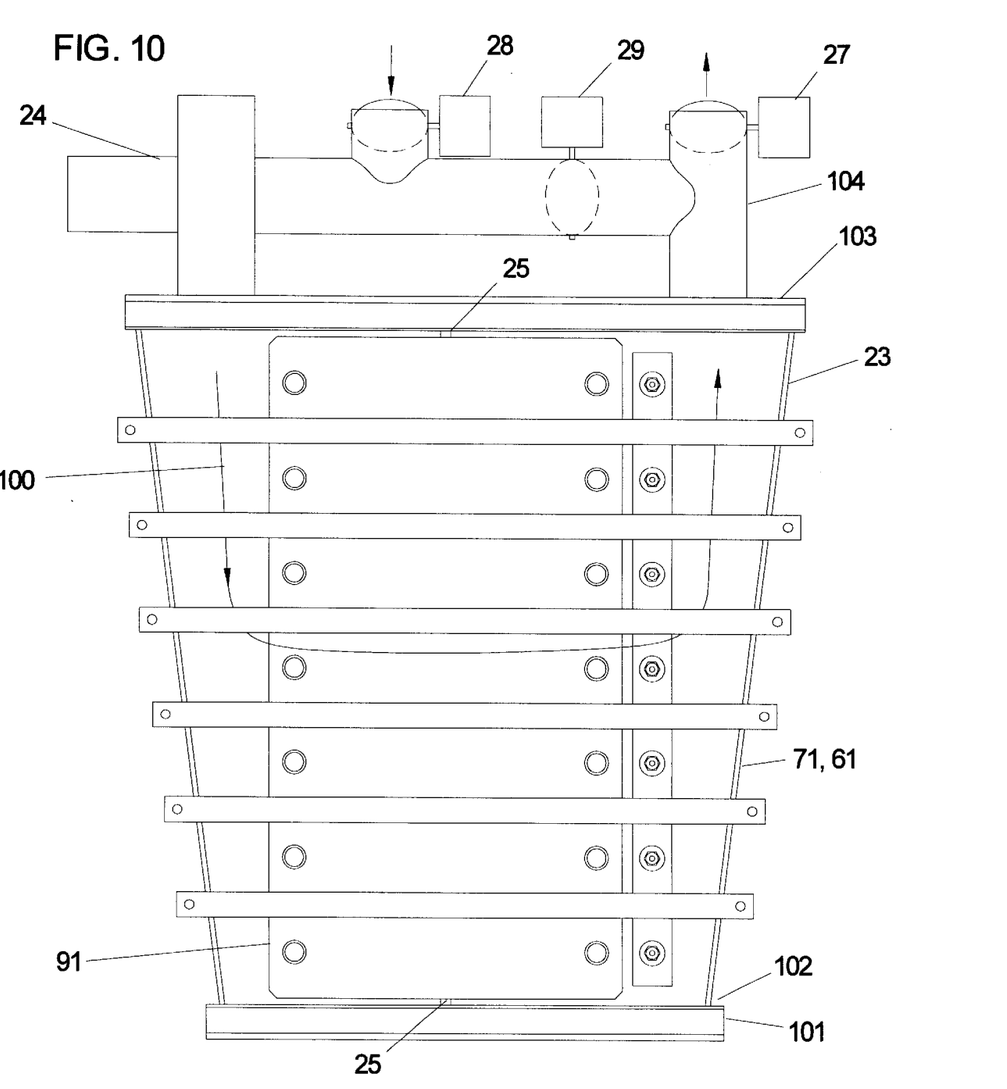
FIG. 10 illustrates a plan view of an assembled fuel cell stack, housing, compression system, and associated ductwork in accordance with the present invention.

Another embodiment of an assembled fuel cell stack is shown in FIG. 10. The walls of housing 23 of the fuel cell stack may optionally be tapered to provide uniform flow to the externally manifolded reactant flow stream 100. An end cap 101 may seal an open end 102 of the assembled stack. End cap 101 may consist of a first layer of material adjacent housing 23 and consistent with the material comprising the housing 23, a second layer of material comprising thermal insulation, and a third layer of material consistent with the material comprising the cold compression plates 91, 94, seen above in connection with FIG. 9. End cap 101 may be firmly held against the edge of the housing half-shells 71 and 61 and seal 25, in order to effectively seal open end 102 and isolate the input side of housing 23 from the output side of housing 23. The seal may comprise a knife-edge metal-to-metal seal, may be provided with flanges and sealant material, or may be welded. End cap 101 may be firmly held to the assembly via tension rods attached to the cold compression plates 91 and 94. Likewise, end cap 103 may be fitted to the assembled stack. End cap 103 may further be fitted with openings for coupling of the recirculation ductwork 104. Recirculation ductwork 104 may be fitted with blower 24 and valves 27, 28, 29, as described above in connection with FIG. 2, for control of the externally manifolded reactant flow stream.

Figure 11:
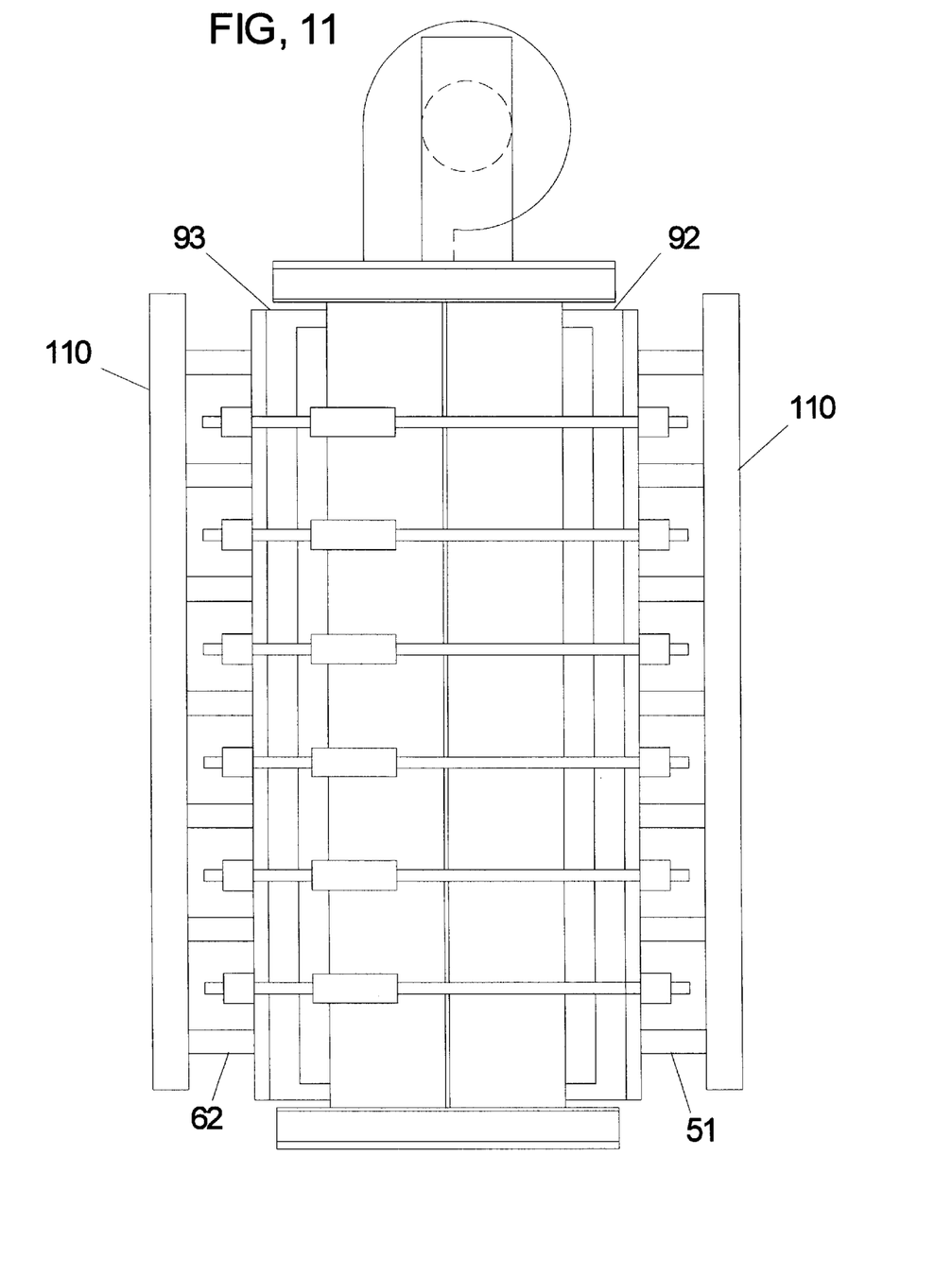
FIG. 11 illustrates a side elevation view of the assembled fuel cell stack, housing, compression system, and associated ductwork.

As seen in FIG. 11, a header 110 may be fluidly coupled to the plurality of feed tubes 51 and 62 to effect the fluid communication of the fuel gas stream with the internal manifolds of the fuel cell stack. Header 110 may further be tapered to effect uniform distribution of pressure and flow to the individual feed tubes 51 and 62. The header 110 may be applied to the inlet feed tubes and to the outlet feed tubes. The header 110 may be applied to inlet feed tubes situated at both the anode pole and the cathode pole of the fuel cell stack. The header 110 may further be applied to outlet feed tubes situated at both the anode pole and the cathode pole of the fuel cell stack.

In certain preferred embodiments, header 110 may be embedded within the insulation 92 and 93 and emerge from the insulation at an end of the assembled fuel cell stack for coupling to a fuel source.

In other preferred embodiments, header 110 may remain external to the assembled fuel cell stack and provide access to catalyst cartridges installed within the internal fuel manifolds to effect catalytic reforming of the fuel inlet stream and to effect catalytic combustion of the fuel outlet stream. Alternatively, the header 110 may be equipped with catalyst cartridges to effect catalytic reforming of the fuel inlet stream and to effect catalytic combustion of the fuel outlet stream.

Header 110 may be located within outlet chamber 33 or inlet chamber 41, seen in FIG. 9, to advantageously effect catalytic reforming of the fuel inlet stream and to advantageously effect catalytic combustion of the fuel outlet stream.

In light of the foregoing disclosure of the invention and description of the preferred embodiments, those skilled in this area of technology will readily understand that various modifications and adaptations can be made without departing from the scope and spirit of the invention. All such modifications and adaptations are intended to be covered by the following claims.

I claim:

1. A fuel cell apparatus comprising, in combination:

a compression assembly;

a housing contained entirely within the compression assembly; and a fuel cell stack positioned within the housing, the fuel cell stack comprising a plurality of bipolar separator plates, each separator plate being formed of a plurality of segments, each segment including an oxidant flow path and a fuel flow path, one of the oxidant flow path and fuel flow path of each segment having internal manifolds and the other of the oxidant flow path and fuel flow path of each segment having external manifolds.

2. The fuel cell apparatus of claim 1, further comprising a pair of seals, a first seal positioned between a first end of the fuel cell stack and the housing and a second seal positioned between a second end of the fuel cell stack and the housing, the pair of seals configured to prevent fluid communication between an inlet portion of the housing and an outlet portion of the housing.

3. The fuel cell apparatus of claim 1, wherein, the compression assembly comprises a plurality of mating first compression bars and second compression bars, the first and second compression bars of each mating pair of compression bars being secured to one another and positioned on opposite sides of the fuel cell stack between adjoining segments of endmost separator plates of the fuel cell stack.

4. The fuel cell apparatus of claim 3, further comprising a plurality of power take-off terminals, each terminal corresponding to a segment and being secured to the housing.

5. The fuel cell apparatus of claim 4, wherein each power take-off terminal comprises an extension formed on a segment.

6. The fuel cell apparatus of claim 1, wherein the compression assembly comprises a plurality of first compression bars and a plurality of mating second compression bars, each pair of mating compression bars secured to one another.

7. The fuel cell apparatus of claim 6, wherein the mating first compression bars and second compression bars are adjustably secured to one another.

8. The fuel cell apparatus of claim 6, wherein the mating first compression bars and second compression bars are secured to one another via tie rods.

9. The fuel cell apparatus of claim 1, wherein the housing includes an oxidant inlet in fluid communication with an inlet chamber of the housing and an oxidant outlet in fluid communication with an outlet chamber of the housing.

10. The fuel cell apparatus of claim 1, wherein the housing includes a fuel inlet in fluid communication with the fuel cell stack and a fuel outlet in fluid communication with the fuel cell stack.

11. The fuel cell apparatus of claim 10, wherein a first feed tube connects the fuel inlet to the fuel cell stack and a second feed tube connects the fuel outlet to the fuel cell stack.

12. The fuel cell apparatus of claim 1, further comprising a dielectric spacer positioned between an anode end of the fuel cell stack and the housing.

13. A fuel cell apparatus comprising, in combination:

a housing comprised of a first half-shell and a second half-shell;

a fuel cell stack positioned within the housing, the fuel cell stack comprising a plurality of bipolar separator plates positioned between a cathode end plate and an anode end plate, each bipolar separator plate including a plurality of segments, each segment including a fuel flow path and an oxidant flow path;

a plurality of first compression bars;

a plurality of second compression bars, each first compression bar secured to a mating second compression bar, the compression bars of a mating pair of compression bars being positioned on opposite sides of the fuel cell stack in between a pair of segments of an endmost bipolar separator plate of the fuel cell stack, the housing being positioned between the first compression bars and the second compression bars;

a cathode compression plate positioned between each second compression bar and one of the half-shells; and an anode compression plate positioned between each first compression bar and the other of the half-shells.

14. The fuel cell apparatus of claim 13, wherein each first compression bar is secured to a mating second compression bar by a plurality of tie rods.

15. The fuel cell apparatus of claim 13, further comprising cathode insulation between each second compression plate and the one of the half-shells.

16. The fuel cell apparatus of claim 13, further comprising anode insulation between each first compression plate and the other of the half-shells.

17. The fuel cell apparatus of claim 13, wherein the housing includes an oxidant inlet in fluid communication with an inlet chamber of the housing and an oxidant outlet in fluid communication with an outlet chamber of the housing.

18. The fuel cell apparatus of claim 13, wherein the housing includes a fuel inlet in fluid communication with the fuel cell stack and a fuel outlet in fluid communication with the fuel cell stack.

19. The fuel cell apparatus of claim 13, wherein a first feed tube connects the fuel inlet to the fuel cell stack and a second feed tube connects the fuel outlet to the fuel cell stack.

20. The fuel cell apparatus of claim 13, further comprising a dielectric spacer positioned between an anode end of the fuel cell stack and the housing.

21. The fuel cell apparatus of claim 13, further comprising a plurality of power take-off terminals secured to the housing.

22. The fuel cell apparatus of claim 21, wherein each power take-off terminal comprises an extension formed on a segment of a bipolar separator plate.

* * * * *